United States Patent [19]

Sweet

[11] 4,035,383

[45] July 12, 1977

[54] EUTECTIC PROCESS FOR PREPARING POLYCHLORO COPPER PHTHALOCYANINE

[75] Inventor: Ronald Lancelot Sweet, Westfield, N.J.

[73] Assignee: E. I. Du Pont de Nemours and Company, Wilmington, Del.

[21] Appl. No.: 619,970

[22] Filed: Oct. 6, 1975

[51] Int. Cl.² .................................. C09B 47/10
[52] U.S. Cl. ....................................... 260/314.5
[58] Field of Search ............................. 260/314.5

[56] References Cited

U.S. PATENT DOCUMENTS

| | | | |
|---|---|---|---|
| 2,247,752 | 7/1941 | Fox | 260/314.5 |
| 2,253,560 | 8/1941 | Detrick et al. | 260/314.5 |
| 2,662,085 | 12/1953 | Holtzman et al. | 260/314.5 |
| 2,782,208 | 2/1957 | Brooks | 260/314.5 |
| 2,793,214 | 5/1957 | Holtzman et al. | 260/314.5 |
| 2,837,279 | 2/1959 | Randall et al. | 260/314.5 |

*Primary Examiner*—Henry R. Jiles
*Assistant Examiner*—Robert T. Bond

[57] ABSTRACT

Improved eutectic process for preparing polychloro copper phthalocyanine by chlorinating copper phthalocyanine in a reaction medium of molten inorganic metal halide and contacting the reaction medium with an aqueous medium to precipitate the polychloro copper phthalocyanine, wherein the improvement resides in adding a reducing agent to the reaction medium after the completion of the chlorination or to the aqueous medium prior to contact with the reaction medium. The improved process provides a highly chlorinated polychloro copper phthalocyanine which is substantially free of tetrachlorophthalimide impurity. The resulting polychloro copper phthalocyanine is a pure green compound useful as a high quality pigment for a variety of applications.

7 Claims, 3 Drawing Figures

EUTECTIC PROCESS FOR PREPARING POLYCHLORO COPPER PHTHALOCYANINE

BACKGROUND OF THE INVENTION

This invention relates to the preparation of polychloro copper phthalocyanine and, particularly, to an improved process for preparing polychloro copper phthalocyanine by the eutectic method.

Polyhalo metal phthalocyanines have been produced by a variety of methods. What appears to be the first attempt to produce halogenated phthalocyanines by halogenation of the synthesized phthalocyanine is described in British Pat. No. 461,268. As halogenating agents therein it is proposed to employ normally liquid halogenating agents, such as sulfuryl chloride, thionyl chloride, bromine, or liquid chlorine. The reaction is normally carried out in a sealed vessel, and at a temperature between 230° and 300° C. Such halogen carriers as aluminum chloride are used in limited quantities, but the bulk of the reaction medium consisted of the liquid halogenating agent. In other words, the halogenating agent is depended upon to supply the liquid medium for the reaction and the process is consequently limited to such halogenating agents as are liquids under the reaction conditions, or to such conditions of operation (e.g., autogenous pressure) as will maintain the halogenating agent in liquid condition. Although the process of British Pat. No. 461,268 produces polyhalo phthalocyanines which were adequate in many respects, the process is not successful in introducing beyond about 12.3 atoms of halogen per molecule, and that only by starting with a tetrachloro or octachloro phthalocyanine can the halogen content of the phthalocyanine be raised to about 13 or 14 atoms per molecule.

An attempt to correct the deficiencies of British Pat. No. 461,268 is described in U.S. Pat. No. 2,247,752. This patent describes a process for preparing highly halogenated metal phthalocyanines by halogenating the metal phthalocyanine in a reaction medium of molten inorganic halide. This process is commonly referred to in the art as the "eutectic" process for preparing polyhalo metal phthalocyanines. The halogenation is normally accomplished by passing gaseous halogen, particularly chlorine, through the molten inorganic halide. Although the amount of gaseous halogen used in this process is not nearly as excessive as that of the liquid halogenating agent of British Pat. No. 461,168, in practice at least 30% excess must be employed because some gaseous halogen bubbles through the molten reaction medium and does not react. By this process it is possible to produce metal phthalocyanines, particularly copper phthalocyanine, having over 13 atoms of chlorine per molecule up to, in some cases, the theoretical maximum of 16 atoms per molecule. The polychloro copper phthalocyanine so produced exhibits a bright green shade which was previously unavailable in colors of the phthalocyanine series.

Although the polychloro copper phthalocyanine produced according to U.S. Pat. No. 2,247,752 is adequate for many applications, the yield, particularly in the case of highly chlorinated copper phthalocyanines, is undesirably low and the pigmentary properties of the product, particularly strength, are not as high as desirable for high quality pigmentary applications. I have found that the problems associated with this process are due predominantly to the formation of tetrachlorophthalimide, a colorless compound useless as a pigment. Tetrachlorophthalimide, which is formed upon contacting the reaction medium with water, cannot be converted to the polychloro copper phthalocyanine and must be extracted from the polychloro copper phthalocyanine with alkali.

To overcome the disadvantages of the conventional eutectic process, I have developed an improved eutectic process which prevents the formation of tetrachlorophthalimide and thus provides for the preparation of a highly chlorinated copper phthalocyanine without substantial yield loss and contamination.

SUMMARY OF THE INVENTION

The invention provides an improved eutectic process for preparing polychloro copper phthalocyanine by (i) chlorinating copper phthalocyanine in a reaction medium of molten inorganic metal halide to form said polychloro copper phthalocyanine and (ii) contacting said reaction medium with an aqueous medium to precipitate said polychloro copper phthalocyanine. The improvement resides in contacting said polychloro copper phthalocyanine after the completion of the chlorination with a reducing agent in an amount sufficient to substantially prevent the formation of tetrachlorophthalimide. The reducing agent, preferably a sulfur-containing compound, can be added to the reaction medium of molten inorganic metal halide after the completion of the chlorination or to the aqueous medium prior to contact with the reaction medium. The polychloro copper phthalocyanine produced in accordance with the invention contains from 13.5 chlorine atoms per molecule of 46.0% by weight to 16 chlorine atoms per molecule of 50.3% by weight, based on the weight of the polychloro copper phthalocyanine.

Since the nature of the eutectic process necessitates operating with at least some excess molecular chlorine, e.g., at least 30% excess, to insure substantially complete chlorination of the copper phthalocyanine, some over chlorination will occur in the reaction medium. Although this invention is not bound by any theory or explanation, it is believed that this over chlorination occurs after completion of the chlorination of the copper phthalocyanine and results in the formation of a chlorine adduct of the following formula

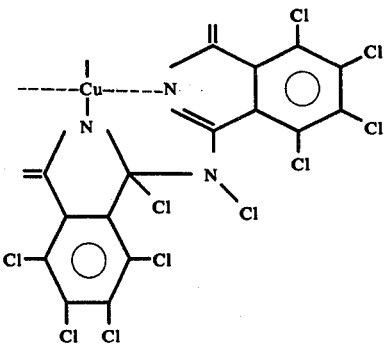

It is believed to be the reaction of this chlorine adduct with the aqueous medium which causes the formation of tetrachlorophthalimide. Although the tetrachlorophthalimide cannot be reversibly transformed back to polychloro copper phthalocyanine in the aqueous medium, the chlorine adduct can be transformed back to polychloro copper phthalocyanine by use of a reducing agent in accordance with the invention.

The reducing agent must not be added to the reaction medium prior to the completion of the chlorination because the molecular chlorine present in the reaction medium will act as an oxidizing agent and preferentially consume the reducing agent wholly or in part before the formation of the chlorine adduct and before the completion of the chlorination, thereby rendering the reducing agent less effective in preventing the formation of the chlorine adduct and the consequent tetrachlorophthalimide.

DETAILED DESCRIPTION OF THE INVENTION

Figure 1:
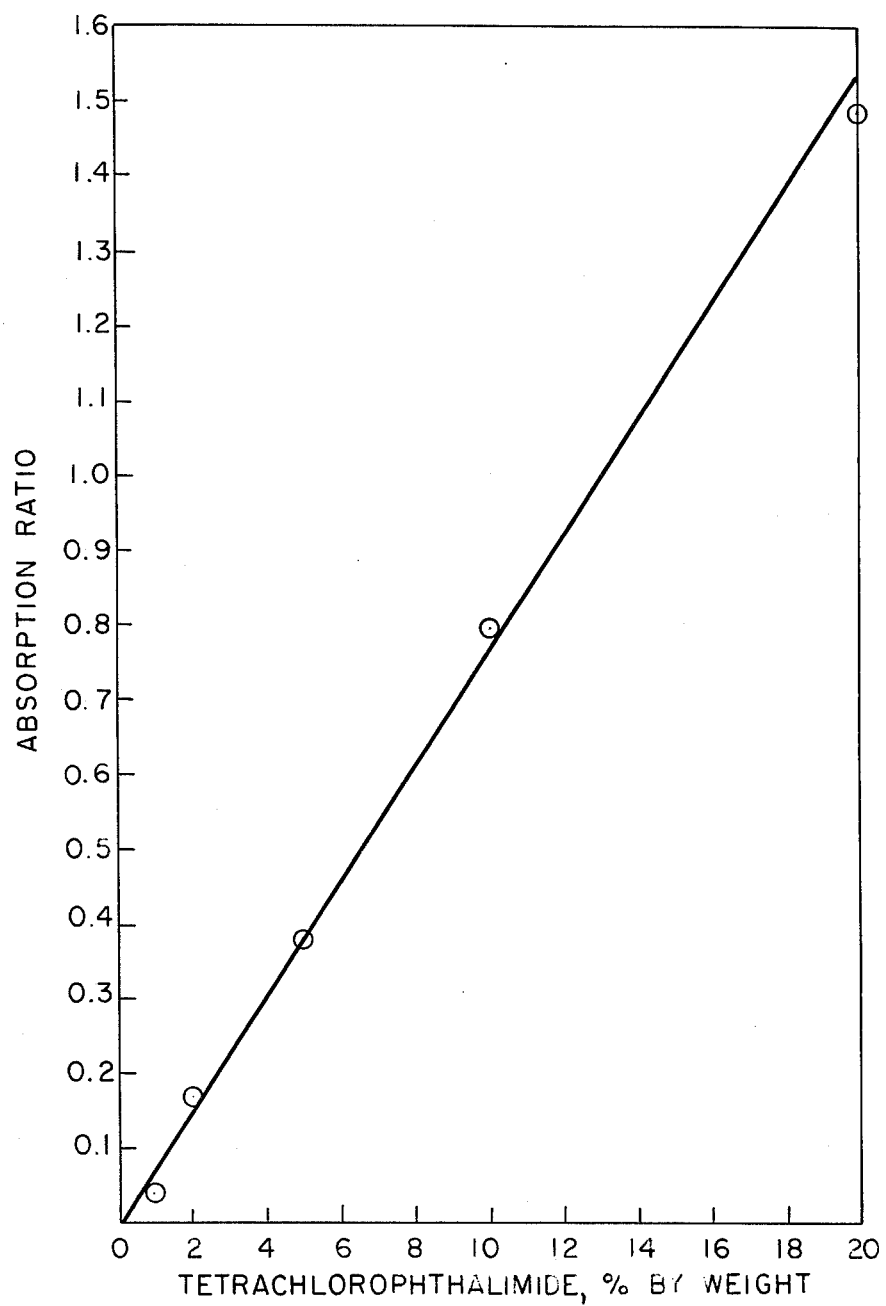
FIG. 1 is a graph of the infrared absorption ratio of the crude polychloro copper phthalocyanine versus the amount of tetrachlorophthalimide present in the crude copper phthalocyanine, as percent by weight based on the total weight of crude polychloro copper phthalocyanine.

The reducing agent utilized in accordance with the invention can be an organic or inorganic compound, preferably containing sulfur, which does not adversely affect the polychloro copper phthalocyanine and which is not adversely affected by aqueous or molten inorganic halide media. Among the inorganic compounds useful in the practice of the invention are elemental sulfur, sulfur dioxide, metal sulfites and their corresponding acids, ammonium sulfites and their corresponding acids, metal bisulfites, metal thiosulfates, metal sulfides, metal polysulfides, metal hydrosulfides, metal thiocarbamates, metal thiocyanates, sulfoxylic acids (H$_2$SO$_2$) and the addition products of inorganic sulfur-containing reducing agents and formaldehyde, such as sodium formaldehyde desulfoxylate. Other inorganic compounds which will not themselves act as reducing agents but will form an effective reducing agent by reaction in the medium of use are also effective. For example, sulfur- and chlorine-containing compounds such as thionyl chloride, sulfuryl chloride and sulfur chloride react with water to form sulfur dioxide and can, therefore, be used in the aqueous medium in accordance with the invention. Also ferrous sulfate can be reacted in situ with sulfur trioxide to form ferric sulfate and sulfur dioxide which acts as a reducing agent. Organic reducing agents useful in the practice of the invention include thiourea, substituted thioureas, organic sulfides, organic disulfides, thioalcohols, organic thioacids and salts, e.g., thioacetic acid and sodium thioacetate, thiocarbazoles, e.g., dithizone, bi or polyfunctional organic sulfur compounds, e.g., cysteine and cystine, thioacetals, thioesters, zanthates, organic sulfoxides, sulfones and carbon disulfide (CS$_2$).

To achieve uniform reducing action throughout the medium it is preferred that the reducing agent be added to the medium in which it functions best. For example, reducing agents which have at least moderate solubility in water, such as sodium thiosulfate and sodium sulfite, can be effectively used in the aqueous medium or the molten inorganic halide. On the other hand, compounds such as sulfur, 2,2'-thiodiethanol and thiourea are preferred for use in the reaction medium of molten inorganic halide.

The amount of reducing agent which should be used can be easily determined by a variety of simple tests, but the most quantitative and reproducible are based upon the measurement of the amount of tetrachlorophthalimide present in the product after the completion of the halogenation, which is directly related to the ratio of the carbonyl absorption for tetrachlorophthalimide to the strongest absorption for polychloro copper phthalocyanine as measured by infrared spectroscopy of the product. The place of the maximum absorption of the carbonyl changes slightly depending upon the amount of tetrachlorophthalimide in the product, but is in the range of 1700 to 1800 cm$^{-1}$, and commonly at 1720 cm$^{-1}$. The strongest absorption band for polychloro copper phthalocyanine normally appears at 1150 cm$^{-1}$. The absorption ratio is determined by taking a small sample from the reaction medium, contacting the sample with an aqueous medium and taking the infra red spectrum of the product. The percent of weight of tetrachlorophthalimide present in the product and based on the weight of the polychloro copper phthalocyanine is determined by separating the polychloro copper phthalocyanine from the tetrachlorophthalimide by extraction with alkali or dimethylformamide and isolating the respective components.

FIG. 1 shows the relationship of the observed absorption ratio to the weight percent of tetrachlorophthalimide in the product. The weight percent of tetrachlorophthalimide in the product should be less than about 5% by weight, and preferably as low as practically possible. At higher amounts, it is necessary to subject the product to further processing steps, e.g., extraction with alkali, to remove the tetrachlorophthalimide prior to use of the product. To achieve the desired quality product the absorption ratio should therefore be less than about 0.4, and preferably as low as practically possible approaching 0 when no tetrachlorophthalimide is present. The determination of the absorption ratio is a rapid accurate method for determining the amount of tetrachlorophthalimide present at any given point in the chlorination after the end point, i.e., the completion of the halogenation, as the tetrachlorophthalimide is not formed until after chlorination is complete.

Figure 2:
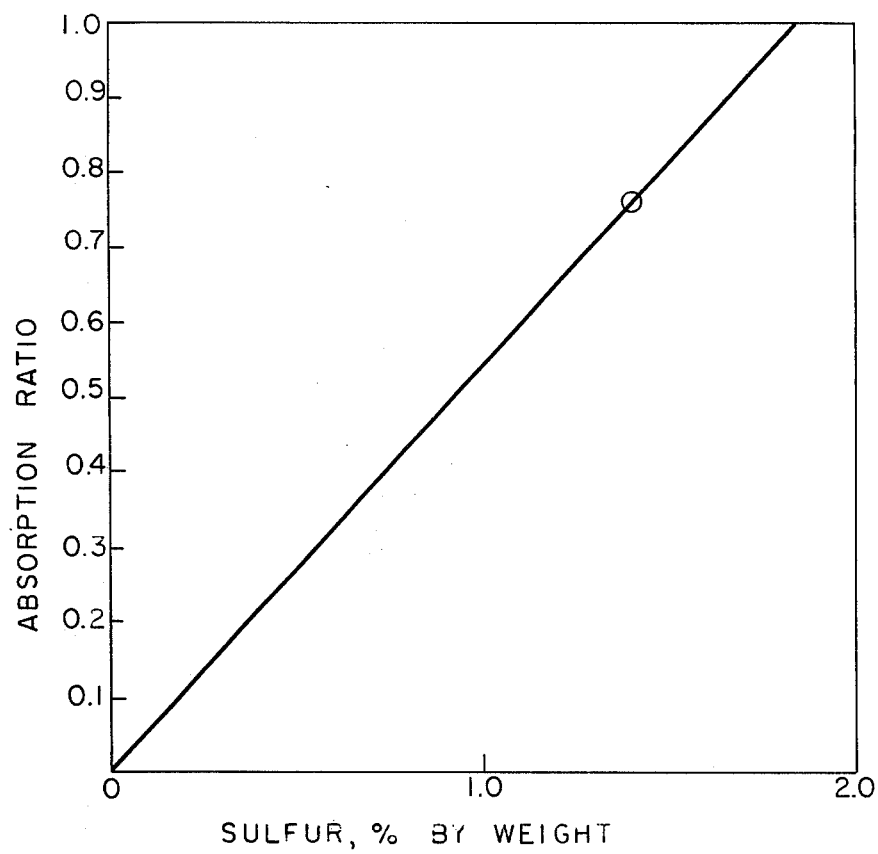
FIGS. 2 and 3 are graphs of the amount of sulfur and Na$_2$SO$_3$, respectively, as percent by weight based on the total weight of the crude copper phthalocyanine needed to substantially eliminate the formation of tetrachlorophthalimide versus the infrared absorption ratio of the crude polychloro copper phthalocyanine.
Figure 3:
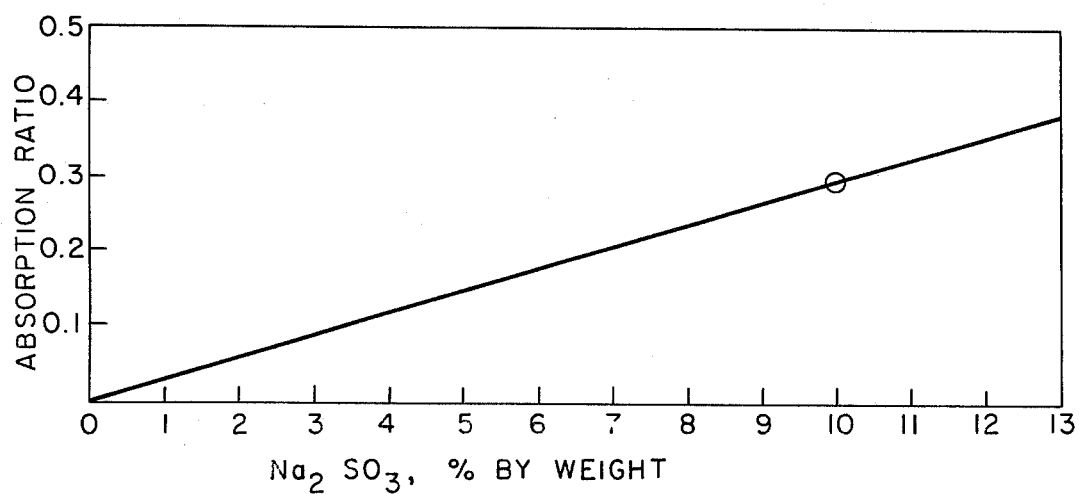

For the reducing agent employed a working graph can easily be determined to relate the amount of reducing agent needed to prevent the formation of tetrachlorophthalimide to the absorption ratio of the sample after the completion of chlorination. FIGS. 2 and 3 illustrate such graphs for elemental sulfur and sodium sulfite, respectively, added to the reaction medium after complete chlorination. These graphs show the weight percent of reducing agent, based on the weight of copper phthalocyanine, necessary to substantially eliminate the formation of tetrachlorophthalimide at the observed absorption ratio. Since the relationship of the amount of reducing agent needed to the amount of tetrachlorophthalimide present and therefore the absorption ratio is approximately direct and linear, the point at which the absorption ratio is 0 is the point at which no reducing agent need be added. To determine a second point withdraw a small sample from the reaction medium, isolate the product and take the infra red absorption, note the absorption ratio, add a few varying amounts of reducing agent to the reaction medium or to the aqueous medium until the absorption ratio of the sample is less than, for example, 0.1. This amount of reducing agent is the amount necessary to substantially eliminate the formation of tetrachlorophthalimide. Enter this amount on the graph opposite the originally observed absorption ratio and draw a straight line to the origin. Using the working graph, which need be prepared only once for each reducing agent and each mode of addition, one can easily read the amount of reducing agent necessary for a determined absorption ratio.

Another method for determining the amount of reducing agent to use by infrared spectroscopy involves observation of a characteristic absorption band at 1165 cm$^{-1}$, which is adjacent to the principle absorption band for polychloro copper phthalocyanine at 1150 cm$^{-1}$. This band, i.e., 1165 cm$^{-1}$, is not present in the absorption spectra of copper phthalocyanine and appears during the chlorination. This band is reduced in size and disappears completely before the appearance of the absorption band at 1720 cm$^{-1}$, which is characteristic of tetrachlorophthalimide. Therefore, the disappearance of this 1165 cm$^{-1}$ band would represent the precise point at which all of the positions on the ring are filled with chlorine. The absorption ratio of this band to the principle band for polychloro copper phthalocyanine at 1150 cm$^{-1}$ can be plotted as the end of the chlorination is approached and extrapolated to zero. Using this to determine the end pont of the chlorination, the amount of reducing agent needed after the end point can then be determined as described above.

A somewhat less quantitative and more subjective test for determining the end point and consequently the amount of reducing agent necessary involves visual examination of the depth of shade of color in the filtrate of the resulting products. As above, samples of the reaction medium are taken and products isolated therefrom during the chlorination. The products are treated with 90% sulfuric acid and filtered. The depth of shade of the filtrate indicates the completeness of chlorination. A very light pale yellow color indicates complete chlorination. Before and after complete chlorination the shade is a darker reddish yellow color.

The conditions under which the chlorination of copper phthalocyanine is accomplished are substantially similar to those described in U.S. Pat. No. 2,247,752. The reaction medium can be composed of anhydrous inorganic metal halide, particularly aluminum chloride, or mixtures of aluminum chloride with other inorganic metal halides, particularly other metal chlorides, which aid in the fluxing thereof and reduces the temperature of the melt. An ideal medium from the viewpoint of commercial availability and economy is a mixture of aluminum chloride and sodium chloride. Other chlorides can be used in place of sodium chloride or in addition thereto, such as potassium chloride, magnesium chloride, ferric chloride, cupric chloride, and antimony trichloride. The use of some of these halides in addition to sodium chloride has the further advantage that, besides reducing the fusion temperature of the mass, they have a catalytic effect and act as so-called "halogen carriers".

The reaction temperature is normally in the range from 160° to 210° C. depending upon the composition of salts in the reaction medium. The halogenating agent, preferably molecular chlorine, need not be present in any great concentration but may be added gradually during the course of the reaction at a rate commensurate with its rate of consumption. Although the eutectic process enables one to operate in an open vessel, it may be carried out in a closed vessel or under pressure if desired. Likewise, although the use of molecular chlorine (gaseous) is preferred for convenience and economy, one may nevertheless practice the eutectic process with liquid chlorine. In general chlorine carriers, i.e., compounds from which chlorine is easily released, such as sulfuryl chloride, are not recommended for use in the invention because of the formation of undesirable by-products during the chlorination which must be cleaned from the off gases prior to venting.

The polychloro copper phthalocyanine is isolated from the reaction medium by contacting the reaction medium with an aqueous medium. The aqueous medium may contain, in addition to water, surface active agents, dispersants, or pigment conditioning agents such as ortho-dichlorobenzene if desired, so long as the medium remains substantially aqueous. It is preferred for complete recovery of the product and complete removal of the inorganic metal halide therefrom that the aqueous medium be acidic, e.g., have a pH of less than 1. The product which precipitates in the aqueous medium is recovered in the conventional manner by filtration, washing and drying. As recovered from this process, the product is referred to as "crude" polychloro copper phthalocyanine because the nature of the product is usually too coarse and the particle size somewhat too large for direction use in high quality pigmentary applications. The crude polychloro copper phthalocyanine can be subjected to a wide variety of finishing techniques well-known to those skilled in the art such as milling or acid pasting to produce a high quality pigment. The pigment can be utilized in various coating compositions such as automotive enamels and house paints to impart a brilliant green shade to the resulting composition.

The following examples illustrate the invention.

EXAMPLES 1a–1c

The following ingredients are placed in a flask, stirred, and heated to 170° C.:

| Ingredient | Amount, grams |
| --- | --- |
| Anhydrous aluminum chloride | 600 |
| Sodium chloride | 102 |
| Anhydrous ferric chloride | 68 |
| Cuprous chloride | 8 |

To the resulting reaction medium 120 g of crude copper phthalocyanine is added. Gaseous chlorine is passed through the reaction medium until 320 g are added.

EXAMPLE 1a

A 24 g sample of the above-prepared reaction medium containing 5.5 g of crude polychloro copper phthalocyanine is stirred with 2 g of anhydrous sodium thiosulfate for 2 minutes. The sample is added to 50 g of water containing 9 g of sulfuric acid. The resulting precipitate is filtered, washed with water, and dried. The infrared absorption spectrum of the product shows a very small absorption at 1720 cm$^{-1}$ and an absorption ratio of 0.04. The product is then mixed with dimethylformamide and heated to 60° C. for 10 minutes. After heating, the product is filtered, washed successively with dimethylformamide, water, and acetone, and dried. The product is found to contain 91.4% by weight of polychloro copper phthalocyanine.

EXAMPLE 1b

A 53 g sample of the above-prepared reaction medium containing 12.2 g of crude polychloro copper phthalocyanine is stirred with 2 g of sulfur for 5 minutes. The product is isolated from the reaction medium as described above for Example 1a. The infrared absorption spectrum of the product shows a very small absorption at 1720 cm$^{-1}$ and an absorption ratio of 0.02. The product is solvent extracted as described above for Example 1a and found to contain 92.3% by weight of polychloro copper phthalocyanine.

EXAMPLE 1c

A 12 g sample of the above-prepared reaction medium containing 2.7 parts of crude polychloro copper phthalocyanine is added to an aqueous medium containing 100 g of water, 1.84 g of concentrated sulfuric acid and 2 g of sodium thiosulfate. The product is filtered, washed with water, and dried. The infrared absorption spectrum of the product shows a very small absorption at 1720 cm$^{-1}$ and an absorption ratio of 0.07. The product is solvent extracted as described for Example 1a and found to contain 86.0% by weight of polychloro copper phthalocyanine.

EXAMPLE 2 AND CONTROL

The following ingredients are placed in a flask, stirred, and heated to 170° C.:

| Ingredient | Amount, grams |
| --- | --- |
| Anhydrous aluminum chloride | 660 |
| Sodium chloride | 112 |
| Anhydrous ferric chloride | 75 |
| Cuprous chloride | 8.8 |

To the resulting reaction medium 132 g of crude copper phthalocyanine is added. Gaseous chlorine is passed through the reaction medium until 375 g are added.

CONTROL

A 205 g sample of the above-prepared reaction medium containing 47.0 g of crude polychloro copper phthalocyanine is added to 1800 g of water containing 260 g of sulfuric acid. The resulting precipitate is filtered, washed with water, and dried. The infrared spectrum of the product shows a very strong absorption at 1720 cm$^{-1}$ and an absorption ratio of 1.58 indicating the presence of a substantial amount of tetrachlorophthalimide. The product is solvent extracted as described in Example 1a and found to contain 56% by weight of polychloro copper phthalocyanine, the balance being attributed primarily to tetrachlorophthalimide.

EXAMPLE 2

A 190 g sample of the above-prepared reaction medium containing 43.5 g of crude polychloro copper phthalocyanine is added to an aqueous medium containing 1800 g of water, 285 g of concentrated sulfuric acid and 65 g of sodium sulfite. The resulting suspension is heated to 60° to 70° C. for 30 minutes, after which the suspension is filtered, washed with water and dried. The infrared absorption spectrum of the product shows a moderate absorption at 1720 cm$^{-1}$ and an absorption ratio of 0.40 indicating the presence of a moderate amount of tetrachlorophthalimide. The product is solvent extracted as described in Example 1a and found to contain 75% by weight of polychloro copper phthalocyanine. This is an increase in yield of 18% over the Control and a corresponding increase in the purity of the product.

EXAMPLES 3a–3d and CONTROL

The following ingredients are placed in a flask, stirred, and heated to 170° C.:

| Ingredient | Amount, grams |
| --- | --- |
| Anhydrous aluminum chloride | 750 |
| Sodium chloride | 126 |
| Anhydrous ferric chloride | 85 |
| Cuprous chloride | 10 |

To the resulting reaction medium 150 g of crude copper phthalocyanine is added. Gaseous chlorine is passed through the reaction medium until 345 g are added.

CONTROL

A 118 g sample of the above-prepared reaction medium containing 27.2 g of crude polychloro copper phthalocyanine is added to an aqueous medium containing 2000 g of water, 320 g of concentrated sulfuric acid, 39 g of orthodichlorobenzene, and 0.4 g of a commercially available surfactant. The resulting precipitate is filtered, washed with water and dried. The infrared absorption spectrum of the product shows a very strong absorption at 1720 cm$^{-1}$ and an absorption ratio of 0.63 indicating the presence of a substantial amount of tetrachlorophthalimide. The product is solvent extracted as described in Example 1a and found to contain 82.5% by weight of polychloro copper phthalocyanine.

EXAMPLE 3a

A 147 g sample of the above-prepared reaction medium containing 33.7 g of crude polychloro copper phthalocyanine is added to the aqueous medium described in the Control except that 16 g of sodium sulfite is also present in the aqueous medium. The resulting precipitate is filtered, washed with water and dried. The infrared absorption spectrum of the product shows a moderate absorption at 1720 cm$^{-1}$ and an absorption ratio of 0.45 indicating the presence of a moderate amount of tetrachlorophthalimide. The product is solvent extracted as described in Example 1a and found to contain 87.8% by weight of polychloro copper phthalocyanine. This is an increase in yield of 5.3% over the Control and a corresponding increase in purity.

EXAMPLE 3b

A 102 g sample of the above-prepared reaction medium containing 23.4 g of crude polychloro copper phthalocyanine is added to an aqueous medium containing 450 g of water, 72 g of concentrated sulfuric acid, 6.5 g of orthodichlorobenzene, 0.072 g of the commercially available surfactant used in the Control and 4 g of thiourea. The resulting precipitate is filtered, washed with water and dried. The infrared absorption spectrum of the product shows a very small absorption at 1720 cm$^{-1}$ and an absorption ratio of 0.066 indicating the presence of a very small amount of tetrachlorophthalimide. The product is solvent extracted as described in Example 1a and found to contain 92.7% by weight of polychloro copper phthalocyanine. This is an increase in yield of 10.2% over the Control and a corresponding increase in purity.

EXAMPLE 3c

A 111 g sample of the above-prepared reaction medium containing 25.5 g of crude polychloro copper phthalocyanine is mixed with 1.2 g of anhydrous sodium sulfite and stirred for 5 minutes. The sample is then added to an aqueous medium containing 450 g of water, 72 g of concentrated sulfuric acid, 6.5 g of ortho-dichlorobenzene, and 0.072 g of the commercially available surfactant used in the Control. The resulting precipitate is filtered, washed with water, and dried. The infrared absorption spectrum of the product shows a small absorption at 1720 cm$^{-1}$ and an absorption ratio of 0.138 indicating the presence of a small amount of tetrachlorophthalimide. The product is solvent extracted as described in Example 1a and found to contain 91.6% by weight of polychloro copper phthalocyanine. This is an increase in yield of 9.1% over the Control and a corresponding increase in purity.

EXAMPLE 3d

A 98 g sample of the above-prepared reaction medium containing 22.5 g of crude polychloro copper phthalocyanine is mixed with 1.2 g of elemental sulfur and stirred for 5 minutes. The product is precipitated as described in the Control, filtered, washed with water, and dried. The infrared absorption spectrum of the product shows a very small absorption at 1720 cm$^{-1}$ and an absorption ratio of 0.026 indicating the presence of a very small amount of tetrachlorophthalimide. The product is solvent extracted as described in Example 1a and found to contain 93.5% by weight of polychloro copper phthalocyanine. This is an increase in yield of 10% over the Control and a corresponding increase in purity.

EXAMPLES 4a–4b and CONTROL

Six hundred grams of anhydrous aluminum chloride and 87 g of sodium chloride are placed in a flask, stirred and heated to 175° C. Then 108 g of crude copper phthalocyanine, containing 100 l g of 100% pure copper phthalocyanine and having an overall purity of 92%, is added to the heated reaction medium. The temperature of the reaction medium is then raised to 200° C. and held at that temperature while gaseous chlorine is passed through the reaction medium until 360 g are added.

CONTROL

A 104 g sample of the above-prepared reaction medium containing 24.6 g of crude polychloro copper phthalocyanine is added to water to separate the product. The resulting suspension is filtered, washed with water and dried. The infrared absorption spectrum of the product shows a very strong absorption at 1720 cm$^{-1}$ and an absorption ratio of 3.12 indicating the presence of a substantial amount of tetrachlorophthalimide. The product is solvent extracted as described in Example 1a and found to contain 46.5% by weight of polychloro copper phthalocyanine, the balance consisting predominantly of tetrachlorophthalimide.

EXAMPLE 4a

A 160 g sample of the above-prepared reaction medium containing 37.5 g of crude polychloro copper phthalocyanine is mixed with 1.5 g of 2,2'-dithioethanol and stirred for 5 minutes. The product is isolated from the reaction medium as described for the Control. The infrared absorption spectrum of the products shows a small absorption at 1720 cm$^{-1}$ and an absorption ratio of 0.143 indicating the presence of a small amount of tetrachlorophthalimide. The product is solvent extracted as described in Example 1a and found to contain 95.7% of polychloro copper phthalocyanine. This shows an increase in yield of 49.2% over the Control and a corresponding increase in purity.

EXAMPLE 4b

A 130 g sample of the above-prepared reaction medium, containing 30.8 g of crude polychloro copper phthalocyanine is mixed with 0.75 g of thiourea and stirred for 5 minutes. The product is isolated from the reaction medium as described for the Control. The infrared absorption spectrum of the product shows a small absorption at 1720 cm$^{-1}$ and an absorption ratio of 0.145 indicating the presence of a small amount of tetrachlorophthalimide. The product is solvent extracted as described in Example 1a and found to contain 94.0% of polychloro copper phthalocyanine. This shows an increase in yield of 47.5% over the Control and a corresponding increase in purity.

What is Claimed Is:

1. In a eutectic process for preparing polychloro copper phthalocyanine by (i) chlorinating copper phthalocyanine in a reaction medium of molten inorganic metal halide to form said polychloro copper phthalocyanine and (ii) contacting said reaction medium with an aqueous medium to precipitate said polychloro copper phthalocyanine, the improvement comprising contacting said polychloro copper phthalocyanine after the completion of the chlorination with a reducing agent in an amount sufficient to substantially prevent the formation of tetrachlorophthalimide.

2. Process for preparing polychloro copper phthalocyanine according to claim 1 wherein said reducing agent is a sulfur-containing compound.

3. Process for preparing polychloro copper phthalocyanine according to claim 2 wherein said reducing agent is added to said reaction medium after the completion of the chlorination.

4. Process for preparing polychloro copper phthalocyanine according to claim 3 wherein said reducing agent is delected from the group consisting of elemental sulfur, sodium thiosulfate, sodium sulfite, 2,2' thiodiethanol, and thiourea.

5. Process for preparing polychloro copper phthalocyanine according to claim 2 wherein said reducing agent is added to said aqueous medium prior to contact with said reaction medium.

6. Process for preparing polychloro copper phthalocyanine according to claim 5 wherein said reducing agent is at least moderately soluble in aqueous medium.

7. Process for preparing polychloro copper phthalocyanine according to claim 6 wherein said reducing agent is selected from the group consisting of sodium thiosulfate and sodium sulfite.

* * * * *